(12) United States Patent
Huett

(10) Patent No.: US 11,850,901 B2
(45) Date of Patent: Dec. 26, 2023

(54) CONTROL SYSTEM FOR A TOWED VEHICLE

(71) Applicant: DA ROUGE PTY LTD ATF DA ROUGE UNIT TRUST, Campbellfield (AU)

(72) Inventor: Andrew Huett, Campbellfield (AU)

(73) Assignee: DA ROUGE PTY LTD ATF DA ROUGE UNIT TRUST, Campbellfield (AU)

( * ) Notice: Subject to any disclaimer, the term of this patent is extended or adjusted under 35 U.S.C. 154(b) by 163 days.

(21) Appl. No.: 17/277,717

(22) PCT Filed: Sep. 23, 2019

(86) PCT No.: PCT/AU2019/000112
§ 371 (c)(1),
(2) Date: Mar. 18, 2021

(87) PCT Pub. No.: WO2020/056448
PCT Pub. Date: Mar. 26, 2020

(65) Prior Publication Data
US 2021/0347218 A1    Nov. 11, 2021

(30) Foreign Application Priority Data

Sep. 21, 2018  (AU) ................................ 2018903551

(51) Int. Cl.
*B60D 1/64*      (2006.01)
*B60R 16/023*    (2006.01)
(Continued)

(52) U.S. Cl.
CPC .............. *B60D 1/64* (2013.01); *B60R 16/023* (2013.01); *B60R 16/03* (2013.01); *H01R 31/065* (2013.01); *H01R 2201/26* (2013.01)

(58) Field of Classification Search
CPC ..... B60R 16/023; B60R 16/03; H01R 31/065; H01R 2201/26
(Continued)

(56) References Cited

U.S. PATENT DOCUMENTS 5,739,592 A * 4/1998 Rigsby ..................... B60D 1/62
                                                  701/32.7
6,224,443 B1 * 5/2001 Mehrmann ............ A63B 31/11
                                                  441/64
(Continued)

*Primary Examiner* — Alexander Gilman
(74) *Attorney, Agent, or Firm* — Bochner PLLC; Andrew D. Bochner

(57) ABSTRACT

There is disclosed a communication system for delivering power and control signals to control the activation of electrical components in a vehicle comprising: a power source for generating a power signal to supply power to the electrical components; a computer controller for generating control signals to control operation of the electrical components; a slave unit operatively connected to both the power source and the computer controller to receive the control signals and to convert the control signals into data signals for transmission to the electrical components; a power supply line for carrying the power signal, or the power signal and the data signals, from the slave unit to each electrical component; and a master unit located remote from said slave unit and configured to receive the data signals from the slave unit and to verify the data signals for further delivery to the required electrical component.

10 Claims, 3 Drawing Sheets

(51) Int. Cl.
*B60R 16/03* (2006.01)
*H01R 31/06* (2006.01)

(58) Field of Classification Search
USPC .......................................................... 439/35
See application file for complete search history.

(56) References Cited

U.S. PATENT DOCUMENTS

| | | | | |
|---|---|---|---|---|
| 2007/0241868 | A1* | 10/2007 | Fackrell | B60T 7/042 340/533 |
| 2015/0203025 | A1* | 7/2015 | Harmon | B60Q 1/22 701/36 |
| 2016/0023587 | A1* | 1/2016 | Bean | B60Q 1/305 340/431 |
| 2016/0052453 | A1* | 2/2016 | Nalepka | G06V 20/41 348/148 |
| 2017/0240125 | A1* | 8/2017 | Weigert | H04L 27/0002 |
| 2018/0244200 | A1* | 8/2018 | Moeller | B60D 1/62 |
| 2020/0171901 | A1* | 6/2020 | Pampattiwar | B60Q 1/305 |
| 2020/0361429 | A1* | 11/2020 | Jahnke | B60R 16/023 |
| 2021/0347218 | A1* | 11/2021 | Huett | B60R 16/023 |

\* cited by examiner

CONTROL SYSTEM FOR A TOWED VEHICLE

RELATED APPLICATIONS

The present application claims priority from Australian provisional patent application No. 2018903551 filed 21 Sep. 2018, the entire contents of which are incorporated herein by reference.

FIELD OF INVENTION

The present invention relates generally to vehicles and towed vehicles, including cars and trucks, trailers, boats and recreational vehicles such as caravans, camper trailers and the like. In particular, the present invention relates generally to a system and method for controlling the operation of electrical components associated with such vehicles to minimise the need for dedicated wiring systems to control features of the vehicle and/or towed vehicle and to simplify electrical and communication transmission between the towed vehicle and the towing vehicle.

BACKGROUND OF THE INVENTION

Towed vehicles, such as caravans and camper trailers, are a popular form of portable accommodation used by many as an economic and enjoyable way in which to experience the outdoors in an independent and comfortable manner. They are typically hitched behind a passenger vehicle and towed to a destination where they may be unhitched from the towing vehicle and set up as an accommodation site in accordance with the user's personal preferences.

During a towing situation, there is a legal requirement that the towed vehicle is in electrical communication with the towing vehicle such that the towing vehicle can operate indicating lamps and braking systems of the towed vehicle for safety reasons. To achieve this, most towed vehicles have a dedicated electrical socket that extends between the vehicles, and connects with an electric plug provided in the towing vehicle. To ensure the integrity of connection between the towing vehicle and the towed vehicle, a variety of mechanical connections have been proposed. Most such connection systems have a variety of pins ranging from between 7 pins to 12 pins, dedicated to supplying control signals from the towing vehicle to the towed vehicle to operate indicator lamps and brakes as desired.

A problem with such conventional electrical connection systems is that the plug and socket arrangement is located external to the vehicles and is exposed to the environment, such as rain and wear, which can have a significant adverse effect on the integrity of electrical contact surfaces. This can result in the wires or contacts of the electrical connection becoming work hardened, crushed, corroded or hyper-extended during regular use, which can weaken their electrical and mechanical attributes. Therefore, over time, there is an increased probability that the connection will fail and require replacement due to faulty or intermittent electrical connections, which can cause accidents due to brake failures or inability to operate the turning indicators. The driver of the towing vehicle may have no indication that the connection has failed or is not working properly and may be oblivious to the potential dangers at hand. The probability of such failures occurring becomes even higher where multiple pins or connections are present.

As well as the basic safety concerns associated with a faulty connection between a towed vehicle and the towing vehicle, with caravans and other such towed vehicles becoming fitted with more and more features such as lighting options, cooking appliances, heating systems and independent braking systems, conventional dedicated wiring systems are difficult to employ, especially with reduced design space. As a result, the electrical wiring of such spaces is extremely complicated and if faults occur, difficult to address in an efficient manner.

Further to this, with access to the internet and other networks becoming increasingly more available and reliable, there is a need to remotely control and monitor devices. This can aid in determining the onset of faults in such devices and to take appropriate remote action, as well as simply controlling the operation of devices to minimise power wastage and the like. Thus, the ability for devices to connect with the internet and other networks to share their status is highly desirable.

Thus, there is also the need to provide for a data and electrical connection system that minimises the number of contacts that can wear or degrade and which simplifies the overall wiring system of the vehicle. Further, there is a need to provide such a control system that enables electric devices connected to the system to be controlled and/or monitored remotely.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the present invention there is provided a communication system for delivering power and control signals to control the activation of electrical components in a vehicle comprising:

a power source for generating a power signal to supply power to the electrical components;

a computer controller for generating control signals to control operation of the electrical components;

a slave unit operatively connected to both the power source and the computer controller to receive the control signals and to convert the control signals into data signals for transmission to the electrical components;

a power supply line for carrying the power signal, or the power signal and the data signals, from the slave unit to each electrical component; and a master unit located remote from said slave unit and configured to receive the data signals from the slave unit and to verify the data signals for further delivery to the required electrical component.

In a first embodiment, the power supply line may extend from the master unit to connect with each of the electrical components to deliver both the power signal and the control signal to the electrical component.

In a second embodiment, the power supply line may extend from the master unit to connect with each of the electrical components to deliver only the power signal to the electrical component.

In accordance with the first embodiment, the data signals may be transmitted to each electrical component by way of a wireless transmission from the master unit. Each electrical component may have a receiver module associated therewith to which the power supply line connect. The receiver module may comprise a wireless receiver for receiving the data signal from the master unit to control the operation of the electrical component. The receiver module may be configured with a transmitter to wirelessly deliver an output signal to the master unit indicative of a working state of the electrical component.

In accordance with the second embodiment, each electrical component may have a receiver module associated therewith to which the power supply line connects.

The receiver module may comprise an addressable unit for decoding the data signal carried by the power supply line to activate the electrical component according to the data signal. The receiver module may be configured with input/output capabilities to deliver an output to the associated electrical component in accordance with a decoded data signal to cause the associated electrical component to function accordingly. The receiver module may be configured with input/output capabilities to receive logic and analogue signals from the electrical component for transmission back to the master and/or slave unit.

In one form, the slave unit may be located in a towing vehicle and the master unit is located in the towed vehicle and the power supply line extends between the towing vehicle and the towed vehicle. In another form, the slave unit may be located on a frame of the towed vehicle and the master unit is located in the towed vehicle and the power supply line extends between the towing vehicle and the towed vehicle.

The one or more electrical components may comprises a computer interface and wherein the associated receiver module may facilitate connection of the computer interface to a network such that the computer interface may comprise a software application capable of configuring the electrical components to function within the communication system.

The computer interface may comprise an external network interface capable of connecting to a network to read/write data associated with one or more electrical components to/from the system to enable diagnostic testing of the one or more electrical components of the system, fault detection in the one or more electrical components of the system, and/or software updates of one or more electrical components of the system.

The computer interface may be configured to manage the electrical components of the system and comprises encoders/decoders, bridges, gateways and third party products connectable to the system.

The software application may be in communication with a remote network that enables remote monitoring of the electrical components of the system to provide fault analysis and system enhancement.

Each receiver module may comprise an encoder/decoder encryption to determine status of the associated electrical component such that only authorised electrical components are capable of functioning within the system.

Accordingly, in another aspect of the present invention there is provided a method of delivering power and control signals to control the activation of electrical components in a vehicle;

forming a power supply line that connects each electrical component in the vehicle to a power source for providing power to operate the electrical component;

connecting a computer controller to the power supply line to utilise the power supply line to deliver control signals to each electrical component to control the operation of the electrical component;

providing a master unit within said power supply line for receiving and verifying the control signals prior to delivery to the electrical component and for receiving response signals generated by the electrical component in response to the control signals transmitted along the power supply line; and processing the response signals to determine an operating status of each of the electrical components.

Accordingly, in yet another aspect of the present invention there is provided a method of delivering power and control signals to control the activation of electrical components in a vehicle;

forming a power supply line that connects each electrical component in the vehicle to a power source for providing power to operate the electrical component;

wirelessly connecting a computer controller to each electrical component to transmit control signals to control the operation of the electrical component;

providing a master unit within said power supply line for receiving and verifying the control signals prior to delivery to the electrical component and for wirelessly receiving response signals generated by each electrical component in response to the control signals transmitted along the power supply line; and processing the response signals to determine an operating status of each of the electrical components.

BRIEF DESCRIPTION OF THE DRAWINGS

The invention may be better understood from the following non-limiting description of preferred embodiments, in which.

DETAILED DESCRIPTION

The present invention will be described below in relation to a caravan of the type that is to be towed by a vehicle. However, it will be appreciated that the present invention could be equally employed in any variety of towed vehicles, such as camper trailers, boats and the like that are to be towed by a vehicle and still fall within the spirit of the present invention. It will also be appreciated that the present invention may also have application to vehicles, both land and water based, which generally have limited space therein to accommodate dedicated wiring systems for electronic appliances.

Figure 1:
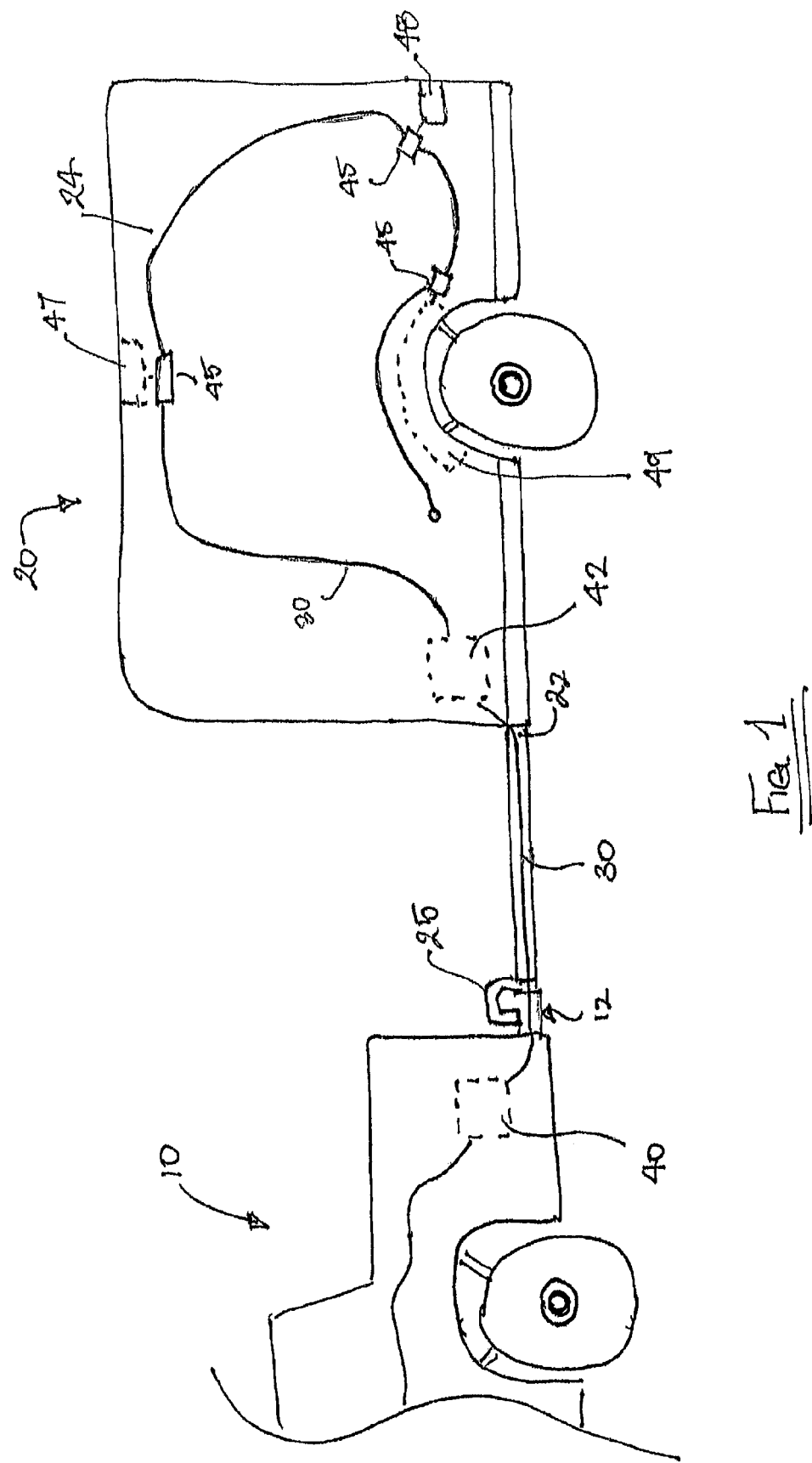
FIG. 1 is a side view of a vehicle and caravan employing the communication system in accordance with an embodiment of the present invention.

Referring to FIG. 1, a towing arrangement 5 is depicted between a towing vehicle 10 and a caravan 20, in accordance with an embodiment of the present invention. The towing vehicle 10 may be a conventional passenger vehicle having a tow ball 12 or the like for hitching the caravan 20 thereto in a conventional manner. The caravan 20 is also of a conventional type and comprises a chassis 22 that supports a body 24 over one or more pairs of wheels 26. The body 24 forms an enclosure over the top of the chassis 22 and is configured to function as a mobile accommodation space, as is well known in the art. A hitch 25 is provided at a front end of the chassis 22. The hitch 25 is configured to attach to the tow ball 12 or similar device on the towing vehicle 10 (not shown) and may be configured in a variety of different ways so as to provide secure attachment to the towing vehicle 10. Other securing devices, such as chains and the like may also be used to ensure secure attachment between the caravan 20 and the vehicle 10.

Figure 3:
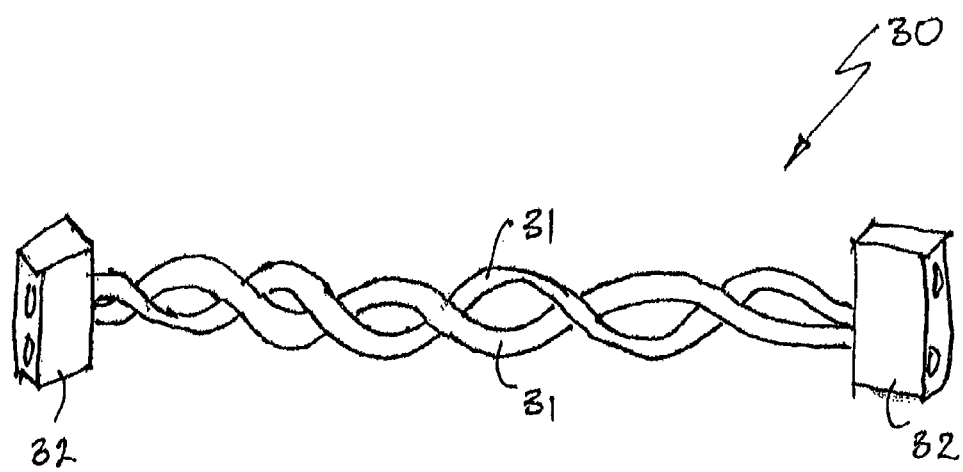
FIG. 3 is a perspective view of an electrical connection system for facilitating electrical connection between a vehicle and a caravan in accordance with an embodiment of the present invention.

To facilitate electrical connection between the towing vehicle 10 and the caravan 20, an electrical connector 30 extends therebetween. The electrical connector 30 extends along the chassis 22 and in a preferred embodiment, is in the form of a pair of wires 31, preferably a pair of twisted wires 31, as depicted in FIG. 3. The connector 30 has a pair of plug members 32 to facilitate connection at either end to the vehicle 10 and caravan 20. As the connector 30 comprises a single pair of wires 31, only two electrical connections need to be made at either end of the connector, greatly simplifying the connection process.

Figure 2:
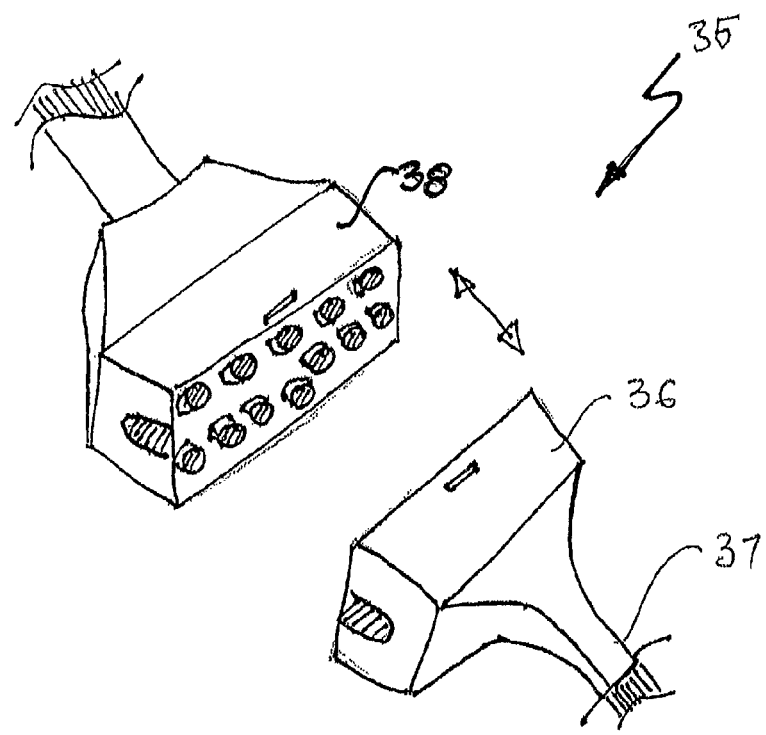
FIG. 2 is a perspective view of an electrical connection system for connection between a vehicle and a caravan in accordance with the prior art.

This aspect of the present invention can be readily appreciated from FIG. 2 which depicts a conventional electrical connection system 35 for delivering power and control signals from the vehicle 10 to the caravan 20. As depicted, the system 35 comprises a plug member 36 that is configured to mate with a socket member 38 such that a total of around six to twelve electrical connections are made between opposing pins in the system. The resultant lead 37 comprises individual wires some of which are dedicated towards providing control signals to operate electrical components of the caravan 20, such as indicator lights and brakes, and some dedicated to providing power to operate such components.

In accordance with one embodiment of the present invention, the connector 30 is able to comprise only two wires 31 rather than twelve wires as is the case with the prior art system 35. This is possible due to the fact that the control signals for controlling the electrical elements are able to be carried by the power wires that supply power from the positive and negative terminals of the battery of the vehicle 10 to the caravan 20. In an alternative embodiment of the present invention that is to be described in more detail below, the control signals may be transmitted to the components wirelessly and the power wires only provide power to the related devices.

Referring back to FIG. 1, in accordance with a first embodiment of the present invention, two-wire connector system is achieved through the provision of a slave unit 40, such as an encoder/decoder, located in the towing vehicle 10 that is in electrical communication with the towing vehicle's Electronic Control Unit (ECU) or ECUs, such that all control signals to be sent to the caravan 20 are directed to the slave unit 40. The slave unit 40 is connected to the DC power line connected to the positive and negative terminals of the vehicle battery which is then connected to the two-wire connector 30 for transmission of power and data to the caravan 20.

In this regard, all control signals to be transmitted to the caravan 20 are received by the slave unit 40 which then processes the signals such that they can be sent over the power lines of the connector 30 to the caravan 20 together with the power signal. At the other end of the connector 30, namely the end that connects to the caravan 20, the power lines are in electrical communication with a master unit 42.

The master unit 42 receives the power signal together with any embedded control signals present therein and identifies the control signals to verify that they are legitimate. In this regard, the master unit 42 is loaded with security certificates to check and verify the data signals before they are able to pass further to their desired destination along the power line.

Referring again to FIG. 1, the dual wire power lines continue from the master unit 42 to connect to each of the required components so as to deliver power to the components as well as control signals. In the embodiment of the invention as shown in FIG. 1, for simplicity, only three main operating components of the caravan 20 are depicted: a central light 47; rear indicator lights 48; and electric braking controller 49. Each of the components 47, 48, 49 has a receiver module 45 associated therewith which is directly connected to the two-wire power line 30 as shown. The receiver module 45 may be a simple addressable device for receiving and decoding the control signal and may have 1-8 switchable outputs for delivering power and controlling the state of the component 47, 48, 49. In this regard, for the rear indicator lights 48, the associated receiver module 45 may receive the control signal requiring the module 45 to activate a left or right indicator light over the power line 30. The module 45 will then process the signal by delivering a signal to operate the required indicator light through a dedicated switchable output, together with a power signal. Only the module 45 that is configured to receive signals addressed to the associated electrical component will respond and operate accordingly.

It will be appreciated that, in accordance with this specific embodiment, the two-wire power line can be arranged in a simple loop to connect to all the electrical components of the caravan to deliver both power and operating signals to the various electrical components. Such a wiring system will significantly reduce manufacture assembly time, have less overall weight due to the minimal use of wires, have less copper usage, be easy to isolate and interrogate faults, be easily scalable to add new components and provide for remote access and monitoring.

In an alternative embodiment to that described above, the system can also be simply adapted to incorporate Bluetooth® and other wireless data exchange systems, through the provision of BLE devices along the two-wire power line that are capable of intercepting data and transmitting data wirelessly to other BLE devices within the system and outside the system, such as to a mobile phone and remote monitoring centre, and the like. This can then enable a wireless mesh system to operate within the two-wire system such that data is transmitted between the electric components wirelessly, with power delivered to the devices via the two-wire system. In such an arrangement, all information collected from the electrical components can be pushed to a remotely located data collector or collator to generate reports about the functioning of one or more electric components within the system. Such a system enables remote diagnostics of problems associated with the caravan components, such as braking system issues, lighting malfunctions and the like, and is also capable of remotely taking regular odometer readings to record the service status of the caravan and provide service updates.

Referring back to FIG. 1, in accordance with the second embodiment of the present invention, two-wire connector system merely provides power to the electrical components of the towed vehicle or caravan 20. The slave unit 40, such as an encoder/decoder with Bluetooth® capabilities or other wireless data exchange system capabilities, may be located in the towing vehicle 10 or mounted at a front region of the caravan's drawbar or frame, and is in electrical communication with the towing vehicle's Electronic Control Unit (ECU) or ECUs. All control signals to be sent to the caravan 20 from the towing vehicle's ECU are directed to the slave unit 40. The slave unit 40 is typically connected to the DC power line connected to the positive and negative terminals of the vehicle battery which is then connected to the two-wire connector 30 for transmission of power to the caravan 20. Data is separately transmitted by the wireless data exchange system to the caravan 20.

In this regard, all control signals to be transmitted to the caravan 20 are received by the slave unit 40 which then processes the signals such that they can be sent wirelessly to a master unit 42 located in the caravan 20. At the other end of the connector 30, namely the end that connects to the caravan 20, the power lines are in electrical communication with the master unit 42. The master unit 42 receives the power signal from the wired connection and the embedded control signals from the wireless data exchange system and identifies the control signals to verify that they are legitimate. In this regard, the master unit 42 is loaded with security certificates to check and verify the wireless data signals before they are able to pass further to their desired destination via the wireless data exchange system.

Referring again to FIG. 1, the dual wire power lines continue from the master unit 42 to connect to each of the required components so as to deliver power to the components. In the embodiment of the invention as shown in FIG. 1, for simplicity, only three main operating components of the caravan 20 are depicted: a central light 47; rear indicator lights 48; and electric braking controller 49. Each of the components 47, 48, 49 has a receiver module 45 associated therewith which has a transmitter/receiver for communicating with the wireless data exchange system.

In this regard, for the rear indicator lights 48, the associated receiver module 45 may wirelessly receive a control signal requiring the module 45 to activate a left or right indicator light. The module 45 will then process the signal by delivering a signal to operate the required indicator light through a dedicated switchable output. Each module 45 will have a receiver that is individually addressable to receive signals addressed to the associated electrical component, which will respond and operate accordingly. In this regard, upon performing the task, the module will also transmit a confirmation signal back to the master unit which can be recorded to verify that the electric component is operating accordingly.

Irrespective of the embodiment of the system employed, a command centre, in the form of a touch-screen monitor may be provided within the caravan to provide a simple point of information to determine the status of all components of the system. The command centre may comprise a microcontroller capable of controlling all of the devices within the system as well as the status of the caravan's battery to ensure that all components are operating within desired operating limits. Where the caravan includes a refrigerator, management routine may be provided within the system to ensure that power is prioritised to be delivered to the refrigerator at all times to ensure that the refrigerator operates correctly. Each of the communication devices provided within the control system of the present invention are capable of encoding all analogue signals and convert to PWM signals to control each particular device, therein digitising the signal for control or transmission to other decoders or external networks.

Figure 4:
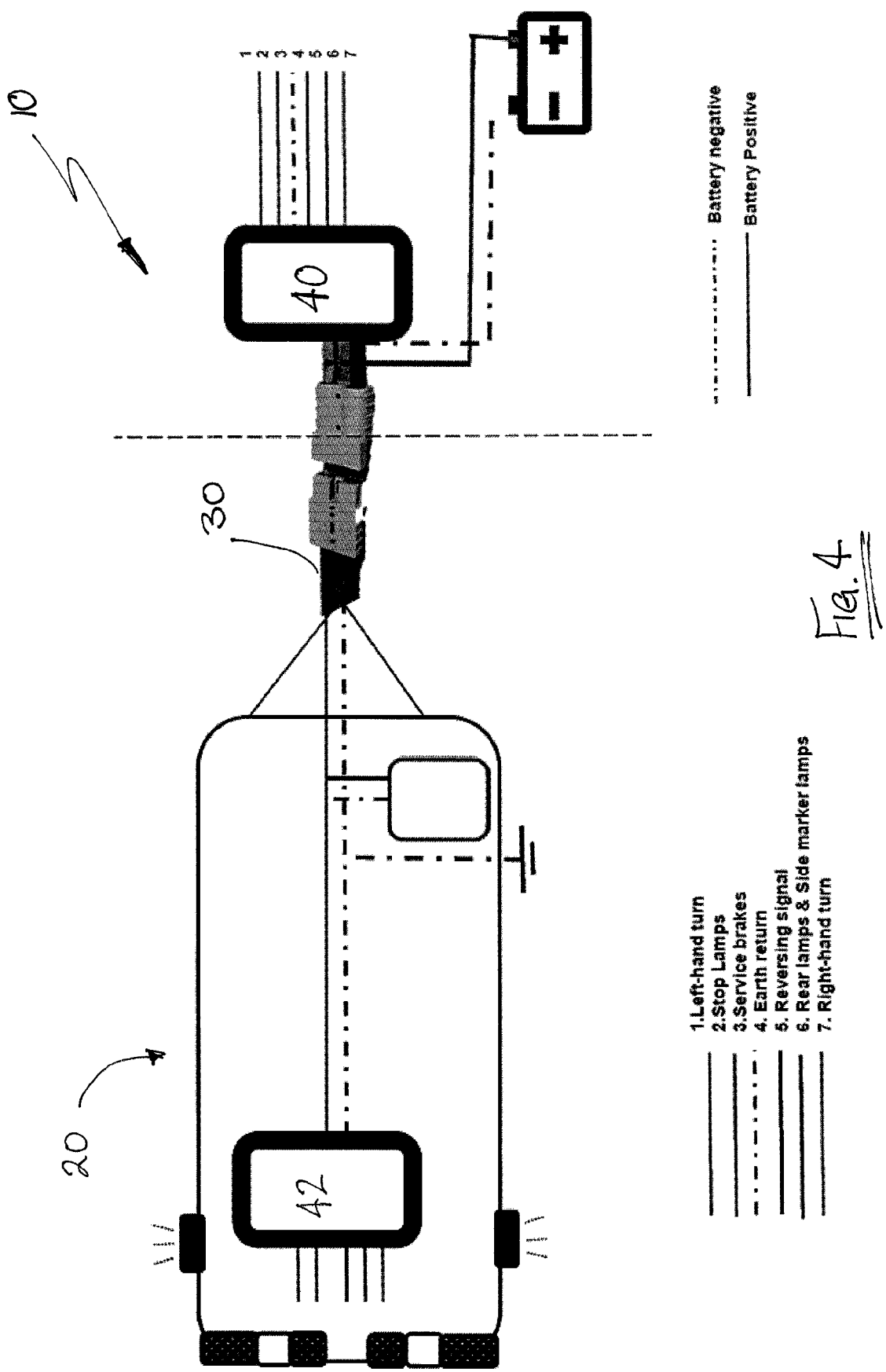
FIG. 4 is a top view a vehicle and caravan employing the communication system in accordance with an alternative embodiment of the present invention.

Whilst the control system of the present invention has been described above as being formed in a loop around the components of the caravan 20, the control system could be arranged in a variety of different configurations, such as a star configuration or several individual loops or circuits. One such alternative arrangement is depicted in FIG. 4.

In this variation of the first embodiment of the present invention, the control signals from the ECU of the vehicle are delivered to the slave unit 40 which converts the signal data to serial data to be sent across the two-wire power line 30 in the manner as previously discussed. The signal data carried by the wires includes left hand turn indicator signals (1), stop lamp activation signals (2), service brake activation signals (3), reversing light activation signals (5), rear lamp and side lamp activation signals (6) and right hand turn indicator signals (7).

The power is DC power generated from the battery of the vehicle as shown. The power line 30 extends from the towing vehicle 10 to the caravan 20 where it terminates at the Master Unit 42. The Master Unit 42 is capable of detecting the presence of a control signal in the power signal and decoding the signal to activate the appropriate electrical component. Each of the components may be wired from the Master Unit 42 such that power and control signals can be separately supplied to the components. It will be appreciated that such a system has a simple two-wire connection to the Master Unit 42 with all the components being wired to the Master Unit 42 to function in a conventional manner.

It will be appreciated that the system and method of the present invention provides a simple and effective means for configuring a caravan or similar vehicle such that the power line is used to provide either both power and control signals, or just power signals, to the components and no dedicated wiring is required for providing control signals. Such a system of wiring reduces the complexity and number of wires required to control the electrical components of such a vehicle and maximises space utilisation to accommodate the wiring. The control system is also fully scalable and capable of accommodating wireless transmitting units and other such systems to remotely monitor the operation of the components.

The ability of the system of the present invention to incorporate network encoders that provide network interconnectivity enables the control system to be established to simply connect every feature and allow the system to be managed and configured by way of a simple software application on a smart phone, tablet or other electrical device. Pairs of lights can be linked and grouped together by a single switch via the software application, which enables all of the electrical logical functions to be established, without the need for complicated internal wiring systems. As a result, a vehicle or space can be simply wired by low-skilled labour as the components only require connection to the power circuit, leaving the skilled labour to make the logical software connections via the software application on electrical devices. Such skilled labour, such as electricians and the like are also able to generate quality tests and reports via their personal electronic device and sign-off on installations and connections through this facility, greatly reducing their workload.

It will also be appreciated that by configuring the control system of the present invention to include an external network interface capability, data is able to be collected about the vehicle and uploaded to the network where the data can be processed to determine the diagnostic status of the system as well as to update system software and find and record faults. Such a system has the potential to provide improved maintenance service to the vehicle, such as a caravan. In this regard, upon the owner of the caravan bringing the caravan to a service centre for a regular service, the service centre is able to connect the vehicle to a computer having the necessary software to interrogate the electrical system to diagnose problems requiring attention and to run integrity tests on the system. The service centre is also able to update any software that may be out of date within the system and give an enhanced historical view of the health of the vehicle and the various components present therein. This can also be done remotely, via a mobile network or internet/cloud in communication with the system. In this regard, software can interface to manage the complete network to perform diagnostics and status updates of the system in real time, which can have particular advantages for caravan manufacturers, especially caravan manufacturer warranty teams, who can investigate and diagnose on-road issues as they occur. Thus by linking the systems to manufacturers of caravans, they are able to identify issues and take action to address issues as they occur, particularly if the vehicle is still under warranty.

The ability of the system to include network bridges and gateways to communicate with other physical networks or protocols for cross network communication allows for enhanced product control, such as the ability to use third party information to control the temperature of an air conditioner.

Further to this, the manner in which the system encoders/decoders are able to encrypt signals to ensure network products are embedded with security tokens and certificates to communicate with the network provides a simple means to ensure that unauthorised products such as lights/indicators, can be excluded from the system. Whilst such copycat and unauthorised products may be able to copy the physical attributes of authorised parts and products, they will not include the encrypted token to communicate with the network and will then be prevented from functioning. Such an improved security function is important to discourage theft of system information from competing system products.

This, depending on the specific embodiment of the present invention, the method of delivering power and control signals to control the activation of electrical components in a vehicle comprises the following steps.

In a first step, a power supply line is formed that connects each electrical component in the vehicle to a power source for providing power to operate the electrical component. The power source may be a battery and the power supply line may comprise a two-cable supply line from the battery that connects each electrical component in series.

In a second step, a computer controller is connected to the power supply line to utilise the power supply line to deliver control signals to each electrical component to control the operation of the electrical component. The computer controller may be connected directly or indirectly to the power supply line. In one form the computer controller may be connected to a slave unit that is connected to the power supply line.

In a third step, a master unit is located within the power supply line to receive and verify the control signals being transmitted to the electrical components prior to delivery to the electrical component. As the master unit is located in the power line it is also capable of receiving response signals generated by the electrical component in response to the control signals transmitted along the power supply line for further processing.

In a final step, the response signals received by the master unit may be processed to determine an operating status of each of the electrical components. It will be appreciated that this may be performed remotely through an appropriate network connection that enables the master unit to transmit data across a network, namely the internet or a telecommunication network where data can be logged and faults trigger an appropriate action.

Alternatively, according to an alternative embodiment, a method of delivering power and control signals to control the activation of electrical components in a vehicle comprises the following steps.

In a first step, a power supply line is formed that connects each electrical component in the vehicle to a power source for providing power to operate the electrical component. The power source may be a battery and the power supply line may comprise a two-cable supply line from the battery that connects each electrical component in series.

In a second step, the computer controller is able to wireless transmit control signals to each electrical component to control the operation of the electrical component. This may be achieved directly or by way of a slave or master unit dedicated to be in communication with the computer controller In a third step, a master unit is located within the power supply line for wirelessly receiving and verifying the control signals prior to wireless delivery of the control signals to electrical component and for wirelessly receiving response signals generated by each electrical component in response to the control signals transmitted along the power supply line.

In a final step, the master unit is capable of processing the response signals to determine an operating status of each of the electrical components. This may include transmitting the status and other useful data to a remote host for storage and analysis to ensure that all components are operating in a desired manner and if a fault is detected, it is readily rectified.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. A communication system for delivering power and control signals from a towing vehicle to control the activation of electrical components in a towed vehicle comprising:
   a power source mounted with respect to the towing vehicle for generating a power signal to supply power to the electrical components in the towed vehicle;
   a computer controller mounted with respect to the towing vehicle for generating control signals to control operation of the electrical components in the towed vehicle;
   a slave unit mounted with respect to the towing vehicle and operatively connected to both the power source and the computer controller to receive the power signal and the control signals and to convert the control signals into data signals;

a master unit mounted with respect to the towed vehicle and configured to receive the data signals and the power signal from the slave unit and to verify the data signals for wireless transmission to a receiver module associated with each required electrical component and a power supply line for carrying the power signal from the master unit to each electrical component.

2. A communication system according to claim 1, wherein the receiver module comprises a wireless receiver for receiving the data signal from the master unit to control the operation of the electrical component.

3. A communication system according to claim 2, wherein each receiver module comprises an encoder/decoder encryption to determine status of the associated electrical component such that only authorised electrical components are capable of functioning within the system.

4. A communication system according to claim 2, wherein the receiver module is configured with a transmitter to wirelessly deliver an output signal to the master unit indicative of a working state of the electrical component.

5. A communication system according to claim 4, wherein the receiver module is configured with input/output capabilities to deliver an output to the associated electrical component in accordance with a decoded data signal to cause the associated electrical component to function accordingly.

6. A communication system according to claim 4, wherein the receiver module is configured with input/output capabilities to receive logic and analogue signals from the electrical component for transmission back to the master unit.

7. A communication system according to claim 1, wherein the one or more electrical components comprises a computer interface and wherein the associated receiver module facilitates connection of the computer interface to a network such that the computer interface comprises a software application capable of configuring the electrical components to function within the communication system.

8. A communication system according to claim 7, wherein the computer interface comprises an external network interface capable of connecting to a network to read/write data associated with one or more electrical components to/from the system to enable diagnostic testing of the one or more electrical components of the system, fault detection in the one or more electrical components of the system, and/or software updates of one or more electrical components of the system.

9. A communication system according to claim 7, wherein the computer interface is configured to manage the electrical components of the system and comprises encoders/decoders, bridges, gateways and third party products connectable to the system.

10. A communication system according to claim 7, wherein the software application is in communication with a remote network that enables remote monitoring of the electrical components of the system to provide fault analysis and system enhancement.

* * * * *